F. HAYES & C. RUPP.
NUTCRACKER.
APPLICATION FILED NOV. 13, 1916.

1,272,803.

Patented July 16, 1918.
4 SHEETS—SHEET 1.

Fig. 1

Witnesses:
Sully Russo
Otto D. Allen

Inventors
Frank Hayes
Carl Rupp
By Frederick Whyou atty

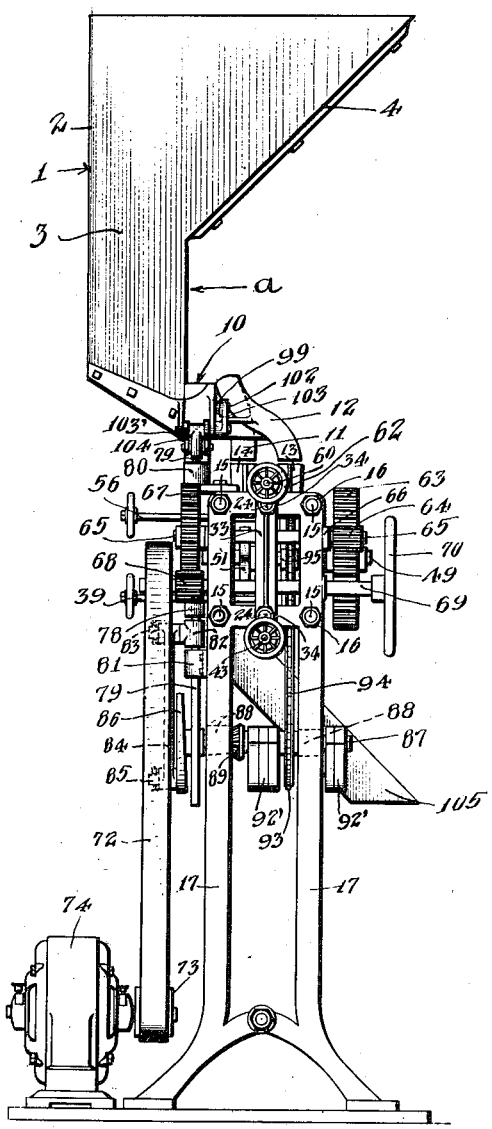
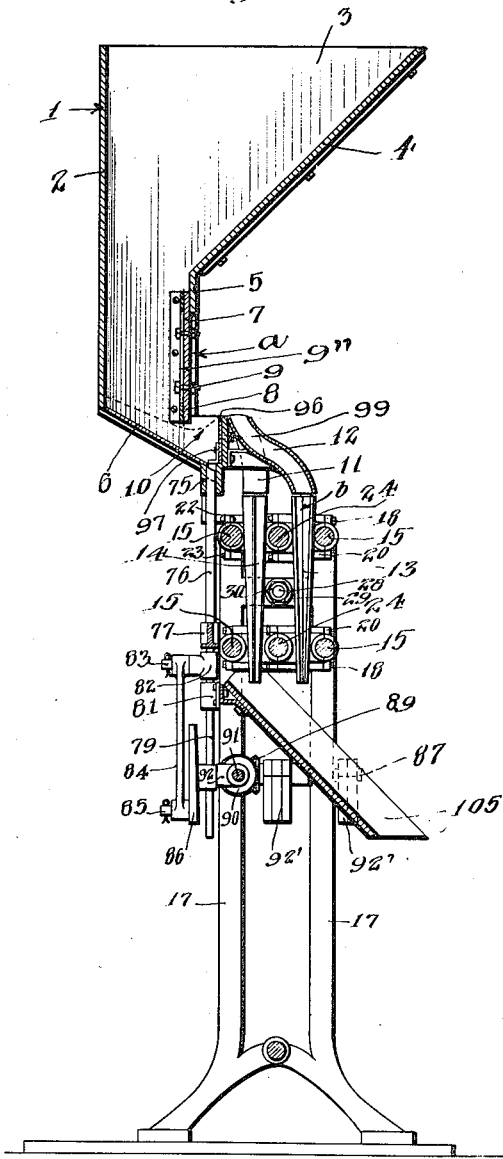

F. HAYES & C. RUPP.
NUTCRACKER.
APPLICATION FILED NOV. 13, 1916.
1,272,803.
Patented July 16, 1918.
4 SHEETS—SHEET 3.
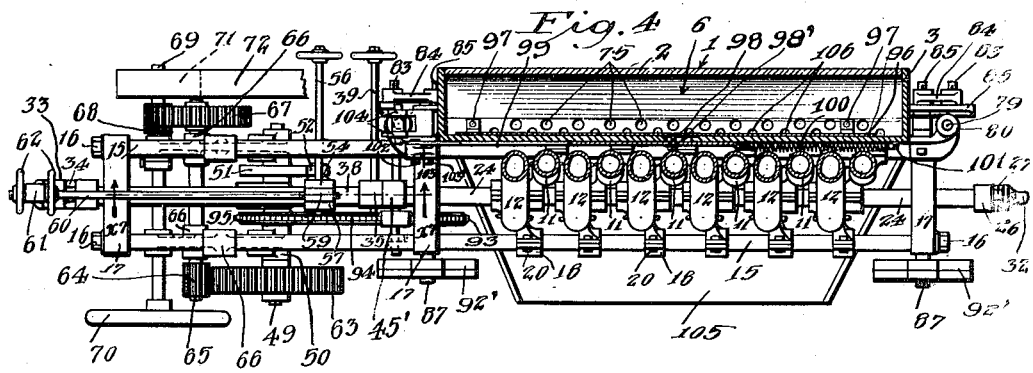
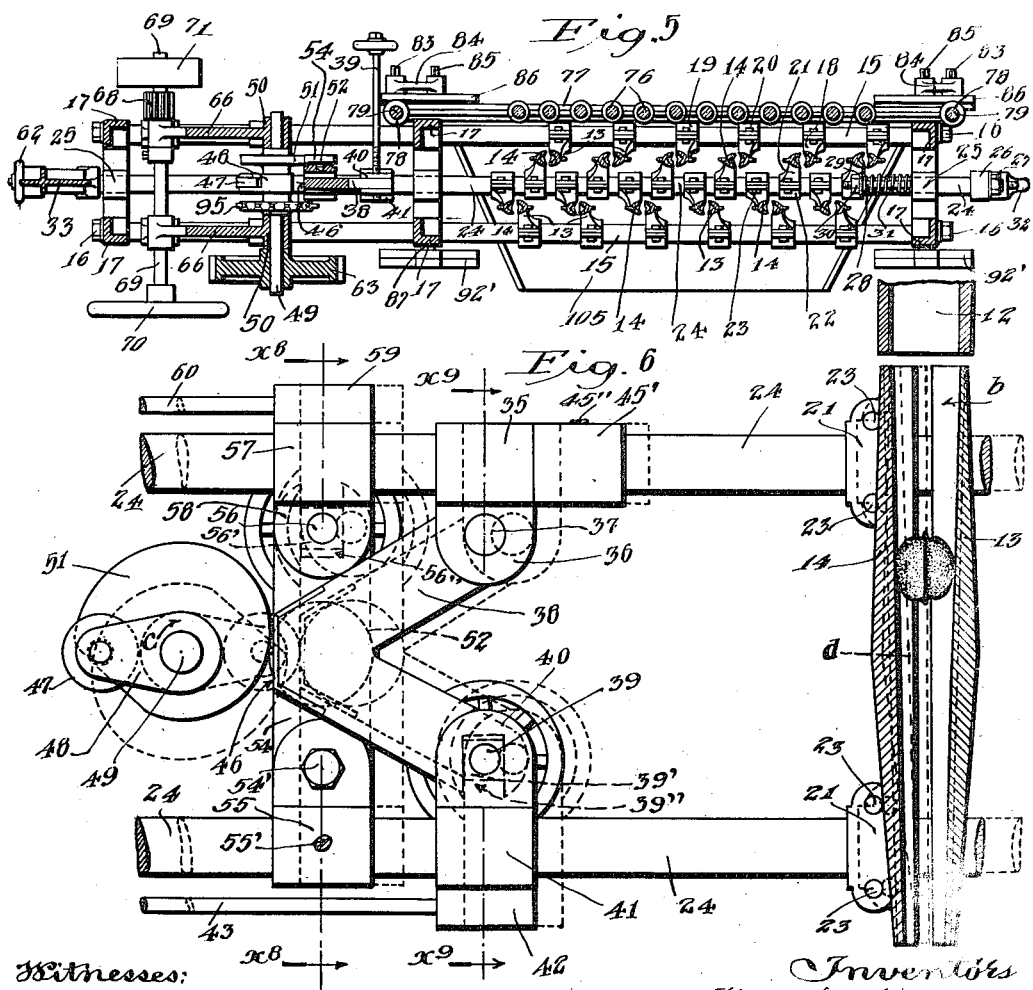

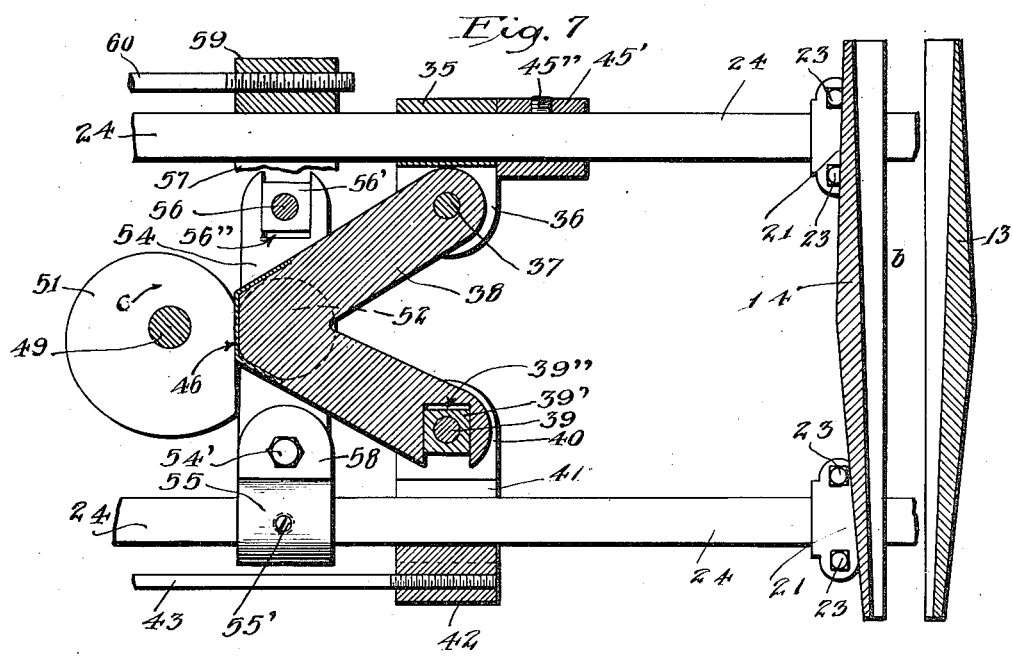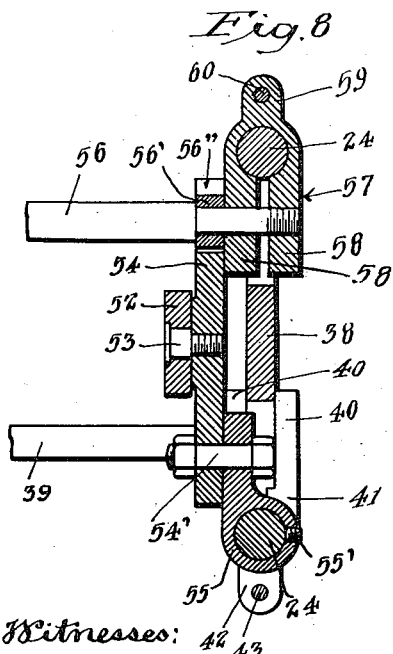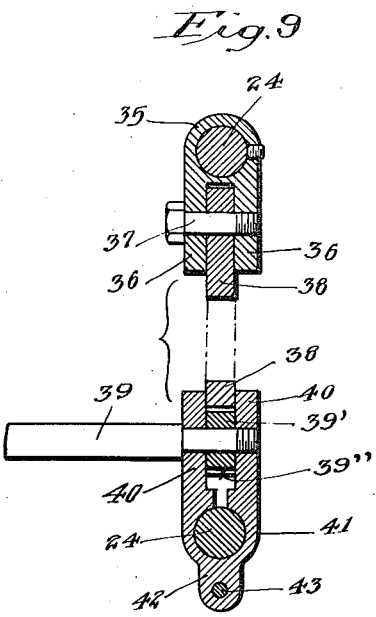

UNITED STATES PATENT OFFICE.

FRANK HAYES AND CARL RUPP, OF LOS ANGELES, CALIFORNIA, ASSIGNORS TO CALIFORNIA WALNUT GROWERS ASSOCIATION, OF LOS ANGELES, CALIFORNIA, A CORPORATION OF CALIFORNIA.

NUTCRACKER.

1,272,803.

Specification of Letters Patent.   Patented July 16, 1918.

Application filed November 13, 1916.   Serial No. 131,030.

*To all whom it may concern:*

Be it known that we, FRANK HAYES and CARL RUPP, both citizens of the United States, residing at Los Angeles, in the county of Los Angeles and State of California, have invented a new and useful Nutcracker, of which the following is a specification.

This invention relates to devices of the character designed for cracking the shells of nuts so that the nut meats can be readily extracted and objects of the invention are to produce a nut cracker which is durable, reliable and strong and capable of relatively great output for its size.

Another object is to produce a device of this character capable of cracking nuts of various sizes at the same time, thus avoiding the necessity of grading the nuts before they enter the jaws of the machine.

Another object is to produce a device of this character capable of feeding the nuts to the jaws with regularity so as to maximize the output of the machine.

Another object is to produce a nut cracker of which the jaws can be readily adjusted, even while the machine is in operation.

Other objects and advantages will appear in the subjoined detail description.

The accompanying drawings illustrate the invention.

Figure 1 is a front elevation of a nut cracker embodying the invention.

Fig. 2 is an end elevation from the left of Fig. 1.

Fig. 3 is a sectional elevation on line indicated by $x^3$—$x^3$, Fig. 1.

Fig. 4 is a plan section on line indicated by $x^4$—$x^4$, Fig. 1.

Fig. 5 is a plan section on line indicated by $x^5$—$x^5$, Fig. 1.

Fig. 6 is an enlarged detail of one pair of cracking jaws and the cam device for operating the jaws, a fragment of one of the hopper feed tubes also being shown and said tube and jaws being in vertical mid section, with a nut held in place between the jaws ready for the cracking operation.

Fig. 7 is an enlarged detail mainly in section on line indicated by $x^7$—$x^7$, Fig. 4.

Fig. 8 is a fragmental sectional elevation on line indicated by $x^8$—$x^8$, Fig. 6.

Fig. 9 is a fragmental sectional elevation on line indicated by $x^9$—$x^9$, Fig. 6.

There is provided a nut hopper indicated in general by the character 1, said hopper in the instance shown in the drawings comprising a vertical rear wall 2, vertical end walls 3, a downwardly and inwardly sloping front wall 4 opposite the wall 2 and a vertical stationary front wall 5 adjoining the front wall 4 and terminating above the front edge of a downwardly and forwardly sloping bottom 6 so as to form an elongated opening *a* through which nuts can discharge from the hopper. In the rear of the stationary wall 5 of the hopper is provided a vertically adjustable wall or gate 7 mounted to shift along guides or ways 8 which may be in the form of angle irons, said gate being provided with screws 9 or equivalent passing through slots 9" in the guides. The gate 7 is designed to regulate the size of the opening *a* and in practice the gate 7 will be so adjusted that the nuts in the hopper will be readily discharged by gravity through the opening *a* and at the same time will not be able to pile up outside of said opening in a feed trough 10 arranged along the front edge of the bottom 6, for otherwise the nuts would be liable to overflow the upper edge of said feed trough, said upper edge being above the level of the bottom 6. The gate may be readily adjusted by first loosening the screws 9 and then tightening them again after the adjustment has been made.

Arranged in front of the hopper 1 with their upper ends on a level with the upper edge of the trough 10 are alternatively arranged feed tubes 11, 12, the feed tubes 11 being almost vertical and the feed tubes 12 alternating with the feed tubes 11 and having their upper ends in alinement with the tubes 11, said tubes 12 curving forwardly and downwardly in a compound curve so that the lower ends of the tubes 12 will be in staggered relation with the lower ends of the tubes 11, thus to discharge in a line forward of the line of discharge of the rear tubes 11. Immediately beneath the discharge ends of the tubes 11, 12 are pairs of downwardly and inwardly tapered stationary and movable jaws 13, 14 respectively, V-shaped in cross section, each pair of jaws forming a downwardly reduced passage *b* into which the nuts one at a time will pass from the tubes 11 or 12 as the case may be. The pairs of jaws 13, 14 are thus arranged in two parallel rows, the pairs of jaws of the front row receiving nuts from the tubes 12 and being in staggered relation with the pairs of jaws of the rear row which receive nuts from the tubes 11. The arrangement is very clearly shown in Fig. 5 and is of value to maximize the volume of output in a minimum space.

The stationary jaws 13 are adjustably mounted on frame members in the form of rods 15 which are fixed by nuts 16 or other suitable means to frame standards 17, and for this purpose said stationary jaws are provided with lugs 18 each forming one member of a clamp, the other member 19 of each clamp being fastened by bolts 20 or equivalent to the clamp member 18. When the bolts 20 are tightened up the clamps 18, 19 tightly embrace one or another of the rods 15 to prevent movement of the stationary jaws 13. There are two upper and two lower rods 15, one of each on each side of the longitudinal mid axis of the machine. The shiftable jaws 14 are provided with lugs 21 each forming one member of a clamp, the other member 22 of each said clamp being fastened by bolts 23 or equivalent to the clamp member 21. The clamp members 21, 22 embrace a reciprocative member 24. The jaws 14 are thus adjustably mounted on the reciprocative member 24 and are firmly held in adjusted position by the bolts 23. There are two of the reciprocative members 24, an upper one between and parallel with the upper rods 15 and a lower one between and parallel with the lower rods 15, and said members reciprocate in bearings 25 formed in the standards 17.

The reciprocative members 24 are connected together at one end by a yoke 26 fastened to said members by nuts 27. Projecting through the yoke 26 is a spring rod 28 which also passes through one of the standards 17 and is provided on its inner end with a washer and nut 29, 30 respectively, there being a coil spring 31 between the washer and said standard 17. The function of the spring 31 is to yieldingly hold the reciprocative members 24 against movement to the right in Fig. 1. The tension of the spring 31 may be adjusted by means of a tension nut 32 screw-threaded on the outer projecting end of the spring rod 28.

The other ends of the shiftable members 24 are connected together by a suitable yoke 33 which is fastened to said members by nuts 34.

Means are provided to move the members 24 against the retractive power of the spring 31 and in the instance shown in the drawings said means are constructed as follows: The upper member 24 is provided with a collar 35 having ears 36 pivoted at 37 to a V-shaped link 38 which in turn is pivoted by a binding screw 39, and block 39' in slot 39'' between ears 40 of a binding collar 41 that in turn is shiftably mounted on the lower member 24, so that by loosening the screw the collar 41 may be adjusted relative to the member 24. For adjusting the collar 41, said collar may be provided with a lug 42 into which is fixed an adjusting screw 43 that passes through a bearing 44 in the yoke 33 and that is provided at opposite ends of said bearing with hand nuts 45 whereby adjustment of the screw 43 may be effected when the screw 39 is loosened. The collar 35 is held against movement away from the roller 47 relative to the rod 24 by a collar 45' adjustably fastened by set screw 45'' on the upper member 24.

The juncture of the arms of the V-shaped link 38 forms an abutment or follower 46 adapted to be engaged by the roller 47 carried by a furcated arm 48 mounted on a cam shaft 49 which is journaled in bearings 50 mounted on the lower frame members 15. The cam shaft 49 is also provided with a cam 51 adapted to engage a follower in the form of a roller 52 journaled at 53 on a link 54 which is pivoted at its lower end by a bolt 54' to a sleeve 55 adjustably fixed by a set screw 55' on the reciprocative member 24 and which is pivoted at its upper end by a binding screw 56 and block 56' in slot 56'' to a binding sleeve 57 shiftably mounted on the upper reciprocative member 24, said adjusting screw 56 being screw-threaded into one of a pair of ears 58 of the sleeve 57. The screw 56 when loosened allows adjustment of the sleeve 57 and when the adjustment has been made said screw will be tightened up to hold said sleeve in adjusted position on the reciprocative member 24. To adjust the sleeves 57, as shown in the drawings, the sleeve 57 may be provided with a boss 59 to which is fixed an adjusting screw 60 that is journaled at 61 in the yoke 33 and that is provided at both ends of said bearings with hand nuts 62 whereby adjustment and locking of the screw 60 is effected.

The working face of the cam 51 is of such contour and is so positioned relative to the roller 47 that when the shaft 49 is turned in the direction of the arrow c, Figs. 6 and 7, the shiftable jaws 14 will be caused to move from the wide open position as in Fig. 7 a determined distance toward the stationary jaws 13 and then maintained in what is herein termed the nut-receiving position as in Fig. 6 for an interval of time sufficient to allow nuts to discharge from the tubes 11, 12 into the jaw passages b, whereupon if the shaft 49 is caused to turn farther in the direction of the arrow c the roller 47 will strike the follower 46 and, owing to the roller projecting slightly beyond the path of travel of the most eccentric portion of the working face of the cam 51, said roller 47 will cause the shiftable jaws 14 to be forced toward the stationary jaws 13 from the nut-receiving position in solid lines in Fig. 6 to the nut-cracking position shown in dotted lines *d* in said figure. The cracking movement is small relative to the movement produced by the cam 51.

The cam shaft 49 is provided with a spur wheel 63 meshing with a spur pinion 64 on a jack shaft 65 which is journaled in bearings 66 mounted on the frame members 15. The jack shaft 65 is provided with a spur gear 67 meshing with a spur pinion 68 on a pulley shaft 69 having a fly wheel 70, for storing up power. The shaft 69 is provided with a pulley 71 driven by a belt 72 which in turn is driven by the pulley 73 of a motor 74.

Means are provided to feed nuts from the trough 10 one at a time into each of the feed tubes 11, 12 and in the drawings such means are constructed as will now be described.

The bottom of the trough 10 is provided opposite the tubes 11, 12 with perforations 75 respectively, and extending up into each perforation is a vertical plunger 76 mounted on a plunger-actuating member 77 in the form of a bar which is provided at its opposite ends with sleeves 78 fastened to vertical rods 79 that reciprocate through upper bearings 80 and lower bearings 81. On each of the rods 79 is fastened a collar 82 and each collar is pivoted at 83 to a pitman 84, and each pitman is pivoted at 85 to an eccentric or crank 86. The eccentrics 86 are mounted on shafts 87 journaled in bearings 88 of the standards 17 and said shafts are provided with bevel gears 89 meshing with bevel gears 90 which are mounted on the opposite ends of a shaft 91 journaled in bearings 92 of the standards 17. The shafts 87 may be provided with counterweights 92'.

One of the shafts 87 is provided with a sprocket wheel 93 engaged by a sprocket chain 94 driven by a sprocket wheel 95 mounted on the cam shaft 49.

The sprocket wheels and gears are so proportioned that the plungers 76 will be reciprocated once to every revolution of the cam shaft 49 and the driving connections are such that the plungers 76 reach their uppermost position just previous to the time that the jaws 14 reach the nut-holding position shown in Fig. 6. The upper ends of the plunger 76 are beveled downward and forward so that a nut resting on the upper end of any one of the plungers will be raised on the upward movement of said plunger and then will freely slide from the upper end of the plunger over the front edge of the trough 10 and into the appropriate feed tube 11 or 12 as the case may be.

In order that each of the plungers 76 may engage and raise a nut at each upward stroke thereof, means are provided to agitate the nuts in the trough 10 and in the instance shown in the drawings said means are constructed as follows: Inside of the trough 10 and along the front side thereof is mounted an agitating member which may be in the form of a plate or bar 96 working against guides 97 near the opposite ends of the trough. The agitating member 96 is provided with a stud or bolt 98 passing through a slot 98' in the front wall of the trough 10, said bolt connecting the agitating plate 96 to an operating member in the form of a rod 99 having at one end a coil spring 100 fastened at 101 to the front of the trough so as to normally tend to move the operating member 99 to the right in Fig. 1. The other end of the operating member 99 is pivoted at 102 to a bell-crank lever 103 which in turn is pivoted at 103' to the adjacent upper bearing 80. One arm of said bell-crank lever 103 is furcated and projects beneath rollers 104 mounted on the upper end of one of the vertical rods 79. When said rod 79 is raised by the means hereinbefore described, the coil spring 100 moves the operating member 99 to the right in Fig. 1 and when said vertical rod operates on its down stroke the rollers 104 engage the bell-crank 103 and causes said bell-crank to pull the operating rod 99 to the left in Fig. 1. Thus, it is clear, the agitating member 96 is reciprocated once to every reciprocative movement of the rods 79, the agitating member being moved in one direction when the plungers are operating on only the final portion of their down strokes and being operated in the opposite direction when the plungers are making only the beginning portion of their up strokes.

Beneath the jaws 13, 14 are chutes 105 extending aslant downward and forward, the lower ends of said chutes being spaced a sufficient distance above the lower ends of the standards 17 to permit of suitable sacks or other containers, not shown, being placed beneath the chutes to receive the cracked nuts discharging from the jaws into said chutes.

It is noted that the front wall of the trough 10 is provided with openings 106 for the purpose of allowing any foreign particles or bits of broken shells to discharge from the trough so that they will not obstruct the mechanism in the trough or lodge on the upper ends of the plungers and thus prevent nuts from being raised by the plungers at every stroke thereof.

In practice, assuming that the relatively movable jaws 13, 14 have been adjusted on the members 15, 24 respectively to give any desired taper to the inter-jaw passages *b* formed by each pair of jaws, that the motor 74 has been started into operation and that nuts have been placed in the hopper 1, it is clear that the nuts will be fed downward through the opening 6 into the trough 10 and that the plungers 76 will each raise one nut at a time and cause said nut to discharge into one of the feed tubes 11, 12 which constitute conveying means. It is noted, see Fig. 3, that the plungers opposite the feed tubes 11 are shorter than the plungers opposite the feed tubes 12 and the reason for this is that the feed tubes 12 being longer than the feed tubes requires a greater length of time for the nuts to pass through the tubes 12 than to pass through the tubes 11, and owing to the difference in length of the plungers the nuts will be discharged into the tubes 12 a little in advance of the discharge of the nuts into the tubes 11, thus the nuts will discharge from the tubes 11, 12 between the appropriate jaws 13, 14 substantially simultaneously. The cam 51, just previous to the time of discharge of the nuts from the tubes 11, 12 has moved the jaws 14 from the position shown in Fig. 7 toward the jaws 13 to the solid line position shown in Fig. 6 so that when the nuts fall from the tubes 11, 12 into the inter-jaw spaces $b$ said nuts will be caught between said jaws and held thereby. If the nuts are large they will be held nearer the top whereas if the nuts are small, owing to the gradual taper or reduction of the passage $b$, said nuts will be held nearer the lower end of the passage. The nuts are thus effectively caught by the different jaws regardless of the sizes of said nuts so that grading of the nuts before being cracked is unnecessary.

The jaws 14 are held stationary for a slight interval of time while the nuts are discharging into the passages $b$ and after the nuts have been caught by the jaws the arm 48 will turn to the position shown in dotted lines in Fig. 6, thus bringing the roller 47 into engagement with the follower 46 so as to force said follower to the right to move the link 38, collar 35, 41 and upper and lower reciprocative members 24 together with the jaws 14 to the position indicated in dotted lines in Fig. 6 so as to bring about a reduction in the cross sectional area of the passages $b$ at the levels where the nuts are held, whereby the nuts are crushed or broken.

Thus it is clear, the jaws 13, 14 are relatively moved toward one another in two separate movements and that nuts are fed one at a time to each pair of coöperating jaws in the intervals of time between said movements and that between the two movements the jaws 13, 14 are held relatively stationary, thus insuring that the full crushing effect is produced on the nuts, for if said jaws should spread even slightly the nuts would tend to remain stationary until gravity overcame the inertia thereof and therefore if the device is operating at high speed the crushing movement might take place before the nuts had dropped to positions where the cracking movement would be effective or fully effective to crack the nuts.

Continued turning of the shaft 48 moves the roller 47 out of engagement with the follower 46 and turns the cam 51 to bring the least eccentric portions of the cam face opposite the follower 52 so as to allow the spring 31 to retract the jaws, members 24 and link 38 from the dotted line position in Fig. 6 to the position shown in Fig. 7 so as to open the jaws 14 to their greatest extent, whereupon the cracked nuts drop from the passages $b$ into the upper ends of the chutes 105 and thence into bags or boxes, not shown, that may be placed beneath said chutes.

When the machine is stationary, or even while in operation, if desired, relative adjustments of the jaws 13, 14 of each pair may be effected so as to change the cross sectional areas of the passages $b$ simultaneously at any given position of the jaws 14, and to do this the attendant will first loosen the binding screw 56 and will then turn the adjusting screw 60 in the appropriate direction to move the shiftable member 24 relative to the sleeve 57 to increase or diminish the distance from the axis of the roller 52 to the inner faces of the jaws 14 thus diminishing or increasing the cross sectional area of the passages $b$ at any given level when the jaws are in the nut-holding positions as in solid lines, Fig. 6. This adjustment would not affect the distance from the face of the follower 46 to the inner faces of the jaws 14 and consequently the cracking movement of the jaws 14 would at the same time be diminished or increased in accordance with the diminution or increase respectively of the cross sectional area of the passages $b$. It follows that when the above described adjustment is made, if the cracking movement is not to be changed, the binding screw 39 will be loosened and the adjusting screw 43 turned in the appropriate direction to increase or diminish the distances between the face of the follower 46 and inner faces of the jaws 14 the same amount as the distances between the axis of the roller 52 and said jaw faces have been increased or diminished.

Thus it is clear that, if greater or less cracking movement is desired without altering the cross sectional area of the passages $b$, the binding screw 39 will be loosened and the adjusting screw 43 turned in the appropriate direction to increase or diminish the distance between the face of the follower 46 and the inner faces of the jaws 14. It is clear that the movement of the jaws 14 will be uniform from end to end and consequently that whether the nut is small and is retained nearer the lower end of the jaws or is large and is retained nearer the upper end of the jaws the amount of cracking movement is alike for the small and large nuts.

We claim:

1. A nut cracker comprising a pair of spaced jaws, a trough, a hopper having a discharge opening communicating with the trough at the side thereof, means to convey nuts from adjacent the rim of the trough to the inter-jaw space, means to lift the nuts one at a time from adjacent the opening and discharge said nuts from the trough over the rim thereof, agitating means movable longitudinally in the trough adjacent the nut-lifting means, and means operating in timed relation with the nut-feeding means to produce relative movement between said jaws.

2. A nut cracker comprising a pair of spaced jaws, a trough, a hopper having a discharge opening communicating with the trough, an adjustable gate for said opening, means to convey nuts from adjacent the rim of the trough to the inter-jaw space, means to lift the nuts one at a time from adjacent the opening and discharge said nuts from the trough over the rim thereof, agitating means movable longitudinally in the trough adjacent the nut-lifting means, and means operating in timed relation with the nut-feeding means to produce relative movement between said jaws.

3. A nut cracker comprising a receptacle for nuts, nut-cracking means, means to operate the nut-cracking means, means operative in timed relation with the nut-cracking-operating means to feed nuts from the receptacle to the nut-cracking means, and agitating means movable longitudinally in the receptacle adjacent the feeding means.

4. A nut cracker comprising a receptacle for nuts, nut-cracking means, means to operate the nut-cracking means, reciprocative means operating in timed relation with the nut-cracker-operating means to feed nuts from the receptacle to the nut-cracking means, and agitating means movable longitudinally in the receptacle adjacent the feeding means.

5. A nut cracker comprising a receptacle for nuts, nut-cracking means, means to operate the nut-cracking means, a plunger having its upper end passing through the bottom of the receptacle, means to reciprocate the plunger, conveying means extending from the rim of the trough and discharging into the inter-jaw space, and agitating means movable longitudinally in the receptacle adjacent the plungers.

6. A nut cracker comprising a receptacle for nuts, nut-cracking means, means to operate the nut-cracking means, a plunger having its upper end passing through the bottom of the receptacle adjacent the front wall of the receptacle, said upper end being beveled downward and forward, means to reciprocate said plunger, a hopper having an opening at the rear side of the receptacle, an adjustable gate for said opening, and conveying means extending downward from the upper edge of said front wall and discharging into the inter-jaw space.

7. A nut cracker comprising a receptacle for nuts, nut-cracking means, means to operate the nut-cracking means, a plunger operative in timed relation with the nut-cracking-operating means to discharge nuts from the receptacle toward the nut-cracking means, and means moving back and forth lengthwise in the receptacle to agitate the nuts adjacent the plunger.

8. A nut cracker comprising a receptacle for nuts, nut-cracking means, means to operate the nut-cracking means, a plunger operative in timed relation with the nut-cracking-operating means to discharge nuts from the receptacle toward the nut-cracking means, and means moving back and forth lengthwise in the receptacle to move nuts toward the plunger.

9. A nut cracker comprising a receptacle for nuts, pairs of spaced jaws, said pairs being in staggered relation, means to cause relative movement of the jaws of each pair, and means to feed nuts simultaneously to all of the inter-jaw spaces.

10. A nut cracker comprising a receptacle for nuts, pairs of spaced jaws, said pairs being in staggered relation, means to cause relative movement of the jaws of each pair, tubes having their upper ends positioned in alinement with one another and having their lower ends in staggered relation to discharge into the inter-jaw spaces respectively, and means to feed nuts simultaneously to the upper ends of the tubes.

11. A nut cracker comprising a receptacle for nuts, pairs of spaced jaws, said pairs being in staggered relation, means to cause relative movement of the jaws of each pair, tubes having their upper ends positioned in alinement with one another and having their lower ends in staggered relation to discharge into the inter-jaw spaces respectively, plungers extending through the bottom of the receptacle opposite the tubes respectively, and means to reciprocate the plungers.

12. A nut cracker comprising a receptacle for nuts, pairs of spaced jaws, said pairs being in staggered relation, means to cause relative movement of the jaws of each pair, tubes having their upper ends positioned in alinement with one another and having their lower ends in staggered relation to discharge into the inter-jaw spaces respectively, plungers extending through the bottom of the receptacle opposite the tubes respectively, means to reciprocate the plungers, and means in the receptacle to agitate the nuts adjacent the plungers.

13. A nut cracker comprising a pair of jaws, and means to produce relative movement between the jaws, said means being adjustable when the jaws are stationary and when the jaws are moving to increase or diminish the amount of said movement.

14. A nut cracker comprising a pair of jaws, means to manually adjust one of said jaws toward or from the other jaw, and means to operate the adjusting means to produce relative movement of the jaws toward one another.

15. A nut cracker comprising a pair of jaws, and means to cause two separate movements of one of said jaws toward the other jaw, said means being manually adjustable to increase or diminish the amount of both of said movements.

16. A nut cracker comprising a pair of spaced jaws, jaw-operating means adjustable when the jaws are stationary and when the jaws are moving to increase or diminish the spacing of the jaws, and a cam to move the jaw-operating means.

17. A nut cracker comprising a pair of spaced jaws, jaw-operating means adjustable when the jaws are stationary and when the jaws are moving to increase or diminish the spacing of the jaws, and a roller operative to move the jaw-operating means.

18. A nut cracker comprising a pair of spaced jaws, jaw-operating means adjustable when the jaws are stationary and when the jaws are moving to increase or diminish the spacing of the jaws, means to move the jaw-operating means a predetermined distance, and other means to move the jaw-operating means another distance.

19. A nut cracker comprising a pair of spaced jaws, a reciprocative member to produce relative movement between said jaws, followers, means separately connecting said followers to the reciprocative member, means to operate the followers, and separate means to adjust the followers toward or from the follower-operating means.

20. A nut cracker comprising a pair of spaced jaws, a reciprocative member to produce relative movement between said jaws, followers, means separately connecting said followers to the reciprocative member, rotary means to operate the followers, and separate means to adjust the followers relative to the follower-operating means.

21. A nut cracker comprising a pair of spaced jaws, reciprocative members to produce relative movement between said jaws, a follower pivotally connected to one of said reciprocative members and adjustably mounted on the other reciprocative member, a second follower pivotally connected to the second named reciprocative member and adjustably connected to the first named reciprocative member, means to independently adjust the adjustable connections, and means to operate said followers.

22. A nut cracker comprising reciprocative members, jaws, one of said jaws being adjustably mounted on the reciprocative members, and means to operate said reciprocative members.

23. A nut cracker comprising stationary members, reciprocative members, jaws, one of said jaws being adjustably mounted on the stationary members and the other jaw being adjustably mounted on the reciprocative members, and means to operate the reciprocative members.

24. A nut cracker comprising stationary members, a jaw mounted on said stationary members, reciprocative members, a second jaw adjacent the first named jaw mounted on the reciprocative members, followers adjustably connected to the respective reciprocative members, and means to independently operate said followers.

25. A nut cracker comprising a plurality of pairs of spaced jaws, and means to produce operation of one jaw of each pair simultaneously, said operating means being adjustable to simultaneously increase or diminish the spacing of the jaws while the jaws are in motion.

26. A nut cracker comprising a plurality of pairs of spaced jaws, and means to produce operation of one jaw of each pair simultaneously, said operating means including means to simultaneously increase or diminish the spacing of the jaws while the jaws are operating.

27. A nut cracker comprising pairs of spaced coöperating jaws, means to cause relative movement between the jaws of each pair, means including plungers for feeding nuts to the inter-jaw spaces, an operating member for the plungers, driving connections between the jaw-moving means and said operating member, an agitating member in the form of a bar extending adjacent all of the plungers, and means operatively connecting the agitating device to said driving connections.

28. A nut cracker comprising jaws forming therebetween a downwardly reduced open-ended passage for nuts, means to cause two separate relative motions between said jaws, means to change the amount of said motions while the jaws are moving, and means to drop nuts one at a time into the upper end of said passage in the interval of time between said motions.

29. A nut cracker comprising jaws, parallel reciprocative members connected to one of said jaws, sleeves on said reciprocative members, collars on said reciprocative members, a link pivoted to said sleeves, a second link pivoted to said collars, operating means for the links respectively, means to adjust one of the sleeves relative to its reciprocative member, and means to adjust one of the collars relative to its reciprocative member.

30. A nut cracker comprising a pair of spaced jaws, means to produce relative movement between the jaws, and means to change the spacing of the jaws during said movement.

Signed at Los Angeles, California, this 2nd day of November, 1916.

FRANK HAYES.
CARL RUPP.

Witnesses:
GEORGE H. HILES,
A. F. SCHMIDTBAUER.